United States Patent Office 3,352,632
Patented Nov. 14, 1967

3,352,632
PRODUCTION OF LEAD TITANATE AND LEAD ZIRCONATE FOR CERAMIC BODIES
Hiromu Sasaki, Osaka, Japan, assignor to Matsushita Electric Industrial Co., Ltd., Osaka, Japan, a corporation of Japan
No Drawing. Filed Mar. 16, 1964, Ser. No. 352,339
Claims priority, application Japan, Mar. 19, 1963, 38/14,821
6 Claims. (Cl. 23—51)

ABSTRACT OF THE DISCLOSURE

High purity and uniform particle size raw material for sintered ceramic bodies of lead zirconate and/or lead titanate is prepared by (1) reacting lead nitrate or lead acetate with titanyl nitrate, zirconyl nitrate or a mixture of both in aqueous oxalic acid to produce the corresponding double oxalate, (2) recovering the double oxalate as the dried salt and then (3) decomposing the salt by heating to produce the desired lead zirconate and/or lead titanate in powdered form.

This invention relates to a process for producing lead titanate, lead zirconate or solid solution of both, for the manufacture of ceramic dielectric material.

In the conventional synthesizing process, an appropriate mixture of titanium oxide, zirconium oxide and lead oxide has subjected to reaction in solid state at an elevated temperature. Lead titanate, lead zirconate or lead titanate-zirconate produced by this process has, however, some problems such as picking up impurities in the mixing procedure preceding the reaction and difficulty of complete mixing, which leads to nonuniform composition. As lead is the chief ingredient of lead titanate, lead zirconate or lead titanate-zirconate, decomposition and evaporation of lead are caused inevitably at the temperature needed for their sintering. Therefore, sintering is required to be practised at a temperature as low as possible in order to reduce lead evaporation. While fine powdered material is needed, in general, to be used for the purpose of sintering at a low temperature, particle size of the powder obtained in the conventional method is comparatively large on an average.

The present invention provides for the preparation of the desired lead compounds which reduce such problems. The power obtained by the present process is small in its particle size, uniform in its composition and to some degree uniform in its diameter. And moreover, a product of high purity is obtained in this process, because no mixing procedure as in the conventional synthesizing process in solid state is required thereby reducing chance inclusion of impurities.

The present invention starts with chemically synthesizing double salt of lead titanyl oxalate, lead zirconyl oxalate or lead titanyl-zirconyl oxalate, next converting the double salt to lead titanate, lead zirconate or lead titanate-zirconate by simple thermal decomposition. The decomposition of these double salts is completed at a temperature of 500°–600° C. In this process, the oxalate salt is dehydrated and decomposes with liberation of steam, carbon dioxide and other gases, and the solid residue is a powder of small diameter particles.

The diameter of granule is about $0.1\mu$ in the case of lead titanate, $0.5\mu$ in lead zirconate and $0.3\mu$ in lead titanate-zirconate. Additions required in order to improve electrical properties of the final product may be performed in the synthesizing process of these salts.

The following examples are set forth by way of further illustration.

EXAMPLE 1

*Synthesis of lead titanate from lead titanyl oxalate*

First, titanium tetrachloride was dropped slowly into ice-cooled distilled water while being stirred. Transparent aqueous solution of titanium tetrachloride was obtained after some period of slow dropping, then gelled precipitate was produced by adding thus obtained aqueous solution in aqueous ammonia. This precipitate was washed enough until chlorine ion was completely free. Then suitable amount of this precipitate was slowly added and dissolved in a known amount of nitric acid. The concentration of this titanyl nitrate solution was determined by means of chemical analysis. Then nitric acid was further added until the molar ratio of nitric acid and titanium in said solution became 5.4:1.0, of course there is some range of allowance for this molar ratio. Therefore, here as an instance it was selected to be 5.4:1, because it had an influence on the molar ratio of lead nitrate and titanyl nitrate in the synthesizing process stated below, consequently on the molar ratio of titanium and lead in the final product of lead titanyl oxalate.

Extra-grade commercial reagent of lead nitrate was used. And, for instance, about 0.05 gram molecule of lead titanyl oxalate was synthesized from said solution of titanyl nitrate, aqueous solution of lead nitrate and aqueous solution of oxalic acid under conditions as below. After a certain amount of titanyl nitrate solution containing 0.05 gram molecule of titanium and aqueous solution of lead nitrate containing 0.06 gram molecule of lead were mixed together and stirred sufficiently, the mixed aqueous solution was further diluted with distilled water to 500 ml. Concentration of both aqueous solutions of titanyl nitrate and lead nitrate had to be prepared preliminarily so as to be satisfied to said diluting condition. Of course, these molar ratio and diluting conditions can be modified to some degree, and here they were selected to compose a condition to keep the molar ratio of titanium and lead in the final product to be 1 to 1. Said mixed aqueous solution was then dropped into 250 ml. of aqueous solution of oxalic acid containing 0.1 gram molecule of oxalic acid. The temperature was being kept at 20° C. during the operation. The reason for this is to heighten the yield of the product. In other words, at a higher temperature, the molar ratio of lead and titanium in the product is changed and therefore several synthesis conditions are required to be modified. Moreover, at a high temperature, a large particle size of powder is produced and hence this makes its filtration easy, but the high temperature synthesis is not desirable because it reduces the yield of the product of lead titanyl oxalate. Furthermore, during filtration after synthesis at a high temperature, lead titanyl oxalate having different composition from that precipitated already begins to precipitate on cooling, and thereby it results a change of the molar ratio of lead and titanum. In course of adding the mixed aqueous solution of lead nitrate and titanium nitrate dropwise into the oxalic acid solution, there developed white precipitate. After the addition of whole of the mixed solution with careful stirring, the obtained precipitate was filtered, washed enough and air dried. The dried precipitate, lead titanyl oxalate, was then thermally decomposed at 700° C. for two hours to obtain lead titanate powder. Thus obtained lead titanate was about of 0.045 molecule, the yield being 90% approximately. The result of chemical analysis showed the ratio of lead and titanium to be 1.00±0.01:1.00, and by X-ray diffraction analysis of the powder, it was confirmed to have crystal phase of lead titanate solely. And the average diameter of granule was determined to be $0.1\mu$ with microscope. Using powder thus obtained, lead titanate was experimentally made. It could be sintered about 100°

C. lower, than that of the conventional lead titanate powder obtained by the reaction in solid state. The present ceramic body was a ferroelectric material with Curie-point at 490° C. The permitivity of this material was 300–400 at room temperature and reached 8,000–10,000 at Curie-point.

EXAMPLE 2

*Synthesis of lead zirconate from lead zirconyl oxalate*

Almost the same procedure as in Example 1 is taken here except using zirconyl nitrate solution in place of titanyl nitrate solution. Extra-grade commercial reagent of zirconyl nitrate was used. Here is described for instance about conditions of synthesizing 0.05 gram molecule of lead zirconyl oxalate as below.

0.1 gram molecule of nitric acid was added into aqueous solution of zirconyl nitrate containing 0.05 gram molecule of zirconium. Nitric acid added here, which was set forth as an example, and can be modified to some extent, is effective to cause large diameter of lead zirconyl oxalate and thereby its filtration becomes easy. On the other hand, aqueous solution of lead nitrate containing 0.05 gram molecule of lead was prepared and mixed with said zirconyl nitrate solution. The mixed solution was further diluted with distilled water to 500 ml. As these amounts and diluting rate of zirconyl nitrate solution and lead nitrate solution can be modified, above described conditions should be considered to be set forth by way of mere illustration. Meanwhile, 250 ml. of oxalic acid containing 0.1325 gram molecule of oxalic acid was prepared, into which said mixed aqueous solution was dropped, keeping the whole at 85° C. with careful stirring. The amount of oxalic acid and concentration of its aqueous solution are also changeable depending on changes of other synthesizing conditions. So above described conditions should be accepted as a mere example. In process of adding the mixed aqueous solution into the aqueous solution of oxalic acid, there developed white precipitate of lead zirconyl oxalate. The reason for choosing the synthesis temperature at 85° C. is to cause a large diameter of lead zirconyl oxalate and thereby to make filtering easy. Even in synthesizing at a lower temperature, the difficulty in filtering the product of lead zirconyl oxalate is much more reduced by adding an excess of nitric acid when preparing the aqueous solution of zirconyl nitrate. And the ratio of lead and zirconium in the product at a lower temperature synthesis is 1:1, the same as in the case at 85° C. Thus obtained precipitate of lead zirconyl oxalate was filtered, washed enough and air dried. Then it was thermally decomposed at 700° C. for two hours to obtain lead zirconate powder. Thus produced lead zirconate was about 0.048 gram molecule, the yield being 96%. The result of chemical analysis showed the ratio of lead and zirconium being 1.00±0.01:1.00. And by X-ray diffraction analysis of the powder, no crystal phase was observed except of lead zirconate. The lead zirconate powder produced by thermal decomposition was $0.5\mu$ in the average diameter. The ceramic body of lead zirconate made from above produced powder was confirmed to be an anti-ferroelectric material with Curie-point at 230° C.

EXAMPLE 3

*Synthesis of lead titanate-zirconate from lead titanyl-zirconyl oxalate*

Titanyl nitrate solution and zirconyl nitrate solution were prepared by the same method as described in Example 1 and Example 2, respectively. Then the titanyl nitrate solution containing 0.05 gram molecule of titanium was mixed together with the zirconyl nitrate solution containing 0.05 gram molecule of zirconium. On the other hand, aqueous solution of lead nitrate containing 0.11 gram molecule of lead was prepared. Both of the solutions were mixed together and further diluted with distilled water to 1000 ml. Meanwhile aqueous solution of oxalic acid was prepared by dissolving 0.2325 gram molecule of oxalic acid into distilled water so as to become 500 ml. In process of adding said mixed solution containing titanium, zirconium and lead into said oxalic acid solution at 20° C., there developed white precipitate of lead titanyl-zirconyl oxalate. After the precipitate was filtered, washed enough and air dried, it was thermally decomposed at 800° C. for two hours. Thus, 0.09 gram molecule of lead titanate-zirconate was obtained with the yield of 90%. By X-ray diffraction analysis, it was confirmed to be completely converted to crystal phase of lead titanate-zirconate. The average diameter of granular was $0.5–1\mu$. Ceramic body made from the present powder was shown to be an excellent piezoelectric material.

The powders for producing ceramic body, obtained by the present invention are with fine granule, uniform composition and high purity, more than 99.9% in all cases. The average diameters of granules are all in the range of $0.1–1\mu$. These properties are extremely effective for producing dielectric ceramics.

EXAMPLE 4

In the present example, synthesis of titanyl nitrate solution was practised by quite the same method as in Example 1, except that lead acetate was used in place of lead nitrate. For example, 0.05 gram molecule of lead titanyl oxalate was synthesized from titanyl nitrate solution, lead acetate solution and aqueous solution of oxalic acid under the condition described below.

After a certain amount of said aqueous solution of titanyl nitrate containing 0.06 gram molecule of titanium and aqueous solution of lead acetate containing 0.055 gram molecule of lead were mixed together and stirred sufficiently, the mixed aqueous solution was further diluted with distilled water to 500 ml. Concentration of both the aqueous solutions of titanyl nitrate and lead acetate must be prepared preliminarily so as to be satisfied to said diluting condition. Of course, these molar ratio and diluting condition may be modified to some degree, and here they were set forth by way of composing a condition to keep the molar ratio of titanium to lead to be 1:1. Said mixed aqueous solution was then dropped into 250 ml. of aqueous solution of oxalic acid containing 0.1 gram molecule of oxalic acid. The temperature was being kept at 20° C. during the operation. In course of adding the mixed aqueous solution of lead acetate and titanium nitrate dropwise into the oxalic acid solution, there developed white precipitate. After whole of the mixed solution was added with careful stirring, the obtained precipitate was filtered, washed enough and air dried. Then the precipitate was thermally decomposed to obtain powder, which was shown to be converted perfectly to lead titanate and to have quite the same property as that in Example 1.

As is inferred from the above, lead acetate instead of lead nitrate in Example 2 and Example 3 can also be used effectively to obtain lead zirconate and lead titanate-zirconate.

When ceramic body is produced with the powder by the present invention, a lower temperature is available, compared to the sintering temperature with the powder by the conventional solid state reaction. Therefore, evaporation of lead is reduced during firing process.

In these examples stated above, mutual relation of specific amount of titanium, zirconium, lead and oxalic acid, and nitric acid added excessively, and temperature can be modified to some extent, so they should not be thought to compose a fixed synthesis condition in each case.

What I claim is:

1. A process for making finely divided compound powder of $PbMO_3$, wherein M represents at least one element selected from the group consisting of titanium and zirconium, which comprises synthesizing a double oxalate of $PbMO(C_2O_4)_2 \cdot nH_2O$ by means of chemical reaction in aqueous solution of a nitrate of M, a water-soluble lead salt, and oxalic acid, filtering and drying said double oxalate, decomposing said double oxalate by heating at an elevated temperature with liberation of water vapor and other gases, and recovering the thereby-produced powdered $PbMO_3$.

2. A process for making $PbTiO_3$ as a finely divided compound powder, which comprises synthesizing a double oxalate of $PbTiO(C_2O_4)_2 \cdot nH_2O$ by reaction in aqueous solution of a water-soluble lead salt, oxalic acid, and nitrate of titanium, filtering and drying said double oxalate, decomposing the double oxalate by heating at an elevated temperature with liberation of water vapor and other gases, and recovering the thereby-produced powdered $PbTiO_3$.

3. A process for making $PbZrO_3$ finely divided compound powder which comprises synthesizing a double oxalate of $PbZrO(C_2O_4)_2 \cdot nH_2O$ by means of reaction in aqueous solution of a water-soluble lead salt, oxalic acid, and a nitrate of zirconium, filtering and drying said double oxalate, decomposing the double oxalate by heating at an elevated temperature with evolution of water vapor and other gases, and recovering the thereby-produced powdered $PbZrO_3$.

4. A process for making $Pb(Ti,Zr)O_3$ as a finely divided powder which comprises synthesizing a double oxalate of $Pb(Ti,Zr)O(C_2O_4)_2 \cdot nH_2O$ by reaction in aqueous solution of a water-soluble lead salt, oxalic acid, and nitrates of titanium and zirconium, filtering and drying said double oxalate, and converting the double oxalate into finely divided $Pb(Ti,Zr)O_3$ powder by heating the said oxalate at an elevated temperature to decompose the same with evolution of water vapor and other gases.

5. The process according to claim 2 in which said water-soluble lead salt is lead nitrate.

6. The process according to claim 3 in which said water-soluble lead salt is lead acetate.

References Cited

UNITED STATES PATENTS

| | | | |
|---|---|---|---|
| 2,166,221 | 7/1939 | Patterson | 23—51 |
| 2,758,911 | 8/1956 | Lynd et al. | 23—51 |
| 2,827,360 | 3/1958 | Blumenthal | 23—51 |
| 2,960,411 | 11/1960 | Brajer et al. | 23—51 X |

FOREIGN PATENTS

| | | |
|---|---|---|
| 691,257 | 5/1953 | Great Britain. |

MILTON WEISSMAN, *Primary Examiner.*

OSCAR R. VERTIZ, *Examiner.*

H. T. CARTER, *Assistant Examiner.*